Patented Apr. 10, 1934

1,954,627

UNITED STATES PATENT OFFICE

1,954,627

PRINTING INK

Joseph F. Jirousek, Cleveland, Ohio, assignor, by direct and mesne assignments, to Mir-A-Col Incorporated, Cleveland, Ohio, a corporation of Ohio No Drawing. Application April 18, 1932, Serial No. 606,081

8 Claims. (Cl. 134—36)

With the customary printing inks a great loss of time is incurred in setting or drying before the further steps of cutting, folding, assembling and binding can be attended to. Efforts to ameliorate this have resulted in premature hardening of inks on the surfaces of the inking rolls, inking plates, etc., as well as filling up the depressions in half-tone forms and the like, "skinning over" in cans and inking mechanism, and difficulties in cleaning. A composition however, which can set quickly and dry rapidly and also handle and feed properly and distribute freely is thus an important desideratum and highly desired in the art.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

In accordance with the present invention, I make a composition of the following ingredients and general ratio of proportions. A wax ½–¾ part by weight, and rosin oil ½ part, paraffin wax being preferable, although other waxes, as bees wax, Chinese wax, spermaceti, etc. may be used, and in some instances I may include petrolatum with the paraffin or other wax under this heading; 1–6 parts of an inorganic bodying agent (preferably dry aluminum hydrate, or in some cases chalk, magnesium oxide, etc.); 10–14 parts of a drying oil (as boiled linseed oil, or tung oil); 1–6 parts of a varnish-type resin and a low boiling cutting solvent (preferably copal for instance 8–10 per cent in alcohol or mineral spirit solvent, or in some cases amber, kauri, synthetic resins, glyptals, etc.); 6–9 parts of pigment (carbon black or desired colors, as reds, blues, greens, yellows, white, etc.); $\frac{1}{16}$–2 parts of drier (japan, lead compounds, cobalt linoleate or resinate, manganese linoleate, resinate or borate, etc.); 1–10 parts of hydrocarbon solvent (as kerosene, varnish makers and painters naphtha, etc.); and ½–2½ parts of an organic solvent liquid of boiling point above 100° C. (preferably benzyl alcohol, or in some cases ethylene glycol mono-ethyl ether, ethylene glycol mono-ethyl ether acetate, amyl acetate, butyl acetate, amyl alcohol, butanol, and mixtures, etc.).

As an illustrative example:—A mixture is made up, employing grinding rolls for instance, comprising 30 pounds dry Royal blue pigment, 15 of heat-treated linseed oil, commonly known as thin plate oil, 6 of double-boiled linseed oil, 8 of iron blue dry pigment, 8 of petrolatum, 8½ of litho-varnish, 7 of dry purple toner pigment, ½ of kauri, 16 of alkali blue red shade in paste form, 32 of dry aluminum hydrate, 16 of rosin oil, second run, 16 of paraffin wax, 32 of cobalt drier, and 32 of kerosene. A mixture of 324 of heat-treated linseed oil, commonly known as heavy plate oil, and 128 of dry carbon black, is separately ground, and this mixture and the foregoing are then ground together, and 152 of copal varnish (9½ per cent of copal, with 35½ per cent vegetable drier and 55 per cent mineral spirits) are incorporated, and 76 of benzyl alcohol.

In the use of such compositions, immediately after the impression is made, heat should be applied, and most advantageously this may be accomplished by a suitable heater, electric, gas, etc., arranged on or adjacent the press, so that the delivered printed impression is subjected to a substantial degree of heat to complete the setting action.

Such compositions may be made up for black or for all colors for printing purposes, whether from type or by various transfer processes upon paper, cardboard, cartons, cloth, leather, imitation leather, cellophane, glassine, celluloid, wood, tin, aluminum, tin-foil, and other materials that can be printed or lithographed. Such composition exhibits a superior covering power, a very thin film being sufficient to carry the requisite density, and the detail in half-tone printing and the like is sharper, with deeper perspective and clearer prints than available with customary compositions. On color work of more than one color, where each color is printed singly, the present composition will trap or superimpose regardless of the time elapsed between printings, the composition having a natural affinity for and laying particularly well upon previously printed colors. With the present composition also, the setting or drying is almost instantaneous as the printed impression is exposed to heat, thereby obviating transfer to the tympan, and work in process can be handled with great rapidity, regardless of how many colors are superimposed. As a result of the rapid throughput, changes in paper for instance due to expansion or contraction, moisture up-take, etc., can in large measure be avoided, and a more perfect register of successive colors on forms requiring such can be had, in contrast to prior difficulties in this direction. Jobs can be printed on both sides in one operation with one or more colors on both sides of the sheet without smearing or offset, and trapping or superimposing of colors takes place without requirement of particularity relative to printing tack, and the work may proceed to the next operation, such as cutting, folding, stitching, trimming, and other bindery operations.

By reason furthermore, of a particularly hard surface finish, impressions so made do not scratch or mar readily, as is commonly the case with ordinary inks. If a press operation has to be interrupted, my composition also has an outstanding advantage of not drying or skinning over in the fountain or on the press, and cleaning may be readily accomplished.

Other modes of applying the principle of my invention may be employed instead of the one explained, change being made as regards the details described, provided the features stated in any of the following claims, or the equivalent of such, be employed.

I therefore particularly point out and distinctly claim as my invention:—

1. A printing ink, comprising ½–¾ part of a wax, 1–6 parts of an inorganic bodying agent, 10–14 parts of a drying oil, 1–5 parts of a resin and low boiling solvent therefor, 6–9 parts of a pigment, $\frac{1}{16}$–2 parts of drier, and a solvent including an organic solvent liquid constituent of boiling point above 100° C.

2. A printing ink, comprising ½–¾ part of a wax, ½ part of rosin oil, 1–6 parts of dry aluminum hydrate, 10–14 parts of a drying oil, 1–5 parts of a resin and low boiling solvent therefor, 6–9 parts of a pigment, $\frac{1}{16}$–2 parts of drier, and a solvent including an organic solvent liquid constituent of boiling point above 100° C.

3. A printing ink, comprising ½–¾ part of a wax, ½ part of rosin oil, 1–6 parts of an inorganic bodying agent, 10–14 parts of a drying oil, 1–5 parts of a resin and low boiling solvent therefor, 6–9 parts of a pigment, $\frac{1}{16}$–2 parts of drier, and a solvent including ½–2½ parts of benzyl alcohol.

4. A printing ink, comprising ½–¾ part of a wax, ½ part of rosin oil, 1–6 parts of an inorganic bodying agent, 10–14 parts of a drying oil, 1–5 parts of a resin and low boiling solvent therefor, 6–9, parts of a pigment, $\frac{1}{16}$–2 parts of drier, 1–10 parts of a hydrocarbon solvent, and ½–2½ parts of benzyl alcohol.

5. In printing ink, comprising ½–¾ part of a wax, ½ part of rosin oil, 1–6 parts of dry aluminum hydrate, 10–14 parts of drying oil, 1–5 parts of copal and low boiling solvent therefor, 6–9 parts of a pigment, $\frac{1}{16}$–2 parts of drier, and a solvent including an organic solvent liquid constituent of boiling point above 100° C.

6. A printing ink, comprising ½–¾ part of a wax, ½ part of rosin oil, 1–6 parts of dry aluminum hydrate, 10–14 parts of a drying oil, 1–5 parts of copal and low boiling solvent therefor, 6–9 parts of a pigment, $\frac{1}{16}$–2 parts of drier, 1–10 parts of a hydrocarbon solvent, and ½–2 parts of an organic solvent liquid constituent of boiling point above 100° C.

7. A printing ink, comprising ¾ part of a wax, ½ part of rosin oil, 1 part of an inorganic bodying agent, 11 parts of a drying oil, 5 parts of a hard resin and low boiling solvent therefor, 6–9 parts of pigment, 1 part of cobalt drier, 1–10 parts of kerosene, and 2½ parts of benzyl alcohol.

8. A printing ink, comprising ¾ part of a paraffin wax, ½ part of rosin oil, 2 parts of dry aluminum hydrate, 8–12 parts of boiled linseed oil, 5 parts of copal and low boiling solvent (copal 9½ per cent with vegetable drier 35½ per cent and mineral spirits 55 per cent), 6–9 parts of pigment, 1 part of cobalt drier, 1–10 parts of kerosene, and 2½ parts of benzyl alcohol.

JOSEPH F. JIROUSEK.